US005282917A

United States Patent [19]

Danelski

[11] Patent Number: 5,282,917

[45] Date of Patent: Feb. 1, 1994

[54] METHOD OF MAKING A PRODUCT HAVING A CONCEALED MESSAGE

[75] Inventor: James J. Danelski, New York, N.Y.

[73] Assignee: Ivy Hill Corporation, New York, N.Y.

[21] Appl. No.: 14,004

[22] Filed: Feb. 5, 1993

Related U.S. Application Data

[63] Continuation of Ser. No. 704,437, May 23, 1991, abandoned, which is a continuation-in-part of Ser. No. 453,704, Dec. 20, 1989, Pat. No. 5,028,076, and a continuation-in-part of Ser. No. 366,172, Jun. 14, 1989, Pat. No. 4,972,953.

[51] Int. Cl.[5] .......... B32B 31/00

[52] U.S. Cl. .......... 156/277; 156/290; 156/291; 156/280; 427/7; 283/56; 283/98; 283/101; 283/903; 206/459.1

[58] Field of Search .......... 156/289, 291, 290, 320, 156/322, 324, 280, 277, 166; 206/459; 283/94, 98, 56, 101, 903; 427/7, 148; 273/139, 281, 292

[56] References Cited

U.S. PATENT DOCUMENTS

| | | | |
|---|---|---|---|
| 4,571,279 | 2/1986 | Oizumi et al. | 156/324 |
| 4,592,946 | 6/1986 | Shuman | 427/148 |
| 4,614,367 | 3/1986 | Breen | 283/102 |
| 4,718,553 | 1/1988 | Adamoli et al. | 206/459 |
| 4,738,473 | 4/1988 | Meloni et al. | 283/903 |
| 5,015,318 | 5/1991 | Smits et al. | 156/289 |

*Primary Examiner*—Patrick J. Ryan
*Assistant Examiner*—Merrick Dixon
*Attorney, Agent, or Firm*—Amster, Rothstein & Ebenstein

[57] ABSTRACT

A wagering, promotional or novelty product having a concealed message includes a sheet having an outer surface, ink visibly disposed on the outer surface in a first pattern, and transparent film overlying at least a portion of the inked outer surface and secured to the ink on the outer surface 8ortion in selected differentially adherent patterns, the first pattern being visible through the film. Removal of the film from the inked outer surface portion also removes the ink in one of the selected patterns to reveal a desired pattern of deinked outer surface and thereby render visible the previously concealed message.

17 Claims, 3 Drawing Sheets

METHOD OF MAKING A PRODUCT HAVING A CONCEALED MESSAGE

CROSS-REFERENCE TO RELATED APPLICATIONS

This application is a continuation of copending application(s) Ser. No. 07/704,437 filed on May 23, 1991, now abandoned, which is a continuation-in-part of U.S. patent application Ser. No. 453,704, filed Dec. 20, 1989, now U.S. Pat. No. 5,028,026 itself a continuation-in-part of U.S. patent application Ser. No. 366,172, filed Jun. 14, 1989, now U.S. Pat. No. 4,972,953, issued Nov. 27, 1990.

BACKGROUND OF THE INVENTION

The present invention relates to wagering, promotional or novelty products, and more particularly to such a product having a concealed message.

Promotional devices such as advertising sheets, wagering games such as lottery tickets, and novelty products such as greeting cards all desirably utilize a gimmick or technique to attract and maintain the interest of the prospective reader or user. A standard but still effective gimmick is the use of a concealed message including light-sensitive hidden messages (which are visible only under light of a particular wavelength), water-activated hidden messages (which are visible when the message is moistened with water), glow-in-the-dark hidden messages (which are visible only in darkness and after initial exposure to light), and rub-off lottery tickets (wherein the winning number or symbol is initially concealed by an opaque coating and revealed only when the coating is scratched or rubbed off, as with an eraser or coin), and the like. Where the product is a wagering card, such as the rub-off lottery ticket which the winning wagerer receives immediate gratification upon comparing the just revealed message with a fixedly visible message on the lottery ticket itself or elsewhere and finding a match, it is also necessary to reassure the wagerer that the person distributing the lottery tickets did not first see the concealed message and thereafter save for himself the winning, tickets, while selling only the losing tickets. Light-sensitive messages, water-activated messages, glow-in-the-dark messages and similar initially concealed messages which revert to their original "concealed" condition after having once been made visible are thus unsatisfactory from this purpose. Rub-off lotto tickets are only slightly better as, rightfully or wrongfully, the user may assume that ticket distributor could rub off the coating, view the "concealed" message, and then sell the winning tickets to himself and sell the losing tickets to others after applying a similar coating to them. Thus, in the case of wagering products, the product ideally evidences the continuously concealed nature of the concealed message prior to the wagerer himself revealing the same—for example, by irreversibly revealing the concealed message once it is revealed.

In any case, the elaborateness of the procedure required to bring out the concealed message may itself prove a turnoff to the user who may object to having to scratch or rub off the coating from the rub-off lottery tickets, to retreat to the bathroom or kitchen or to obtain water, to locate a room with special lighting or a dark room in order to see a message. Thus the need remains for a novelty item having a gimmick which reveals a concealed message easily, simply, rapidly and without the need for a special environment (such as darkness, special light, fluid, or the like).

Accordingly, it is an object of the present invention to provide a method of making a novelty product having a concealed message which is easily, simply, and rapidly revealed without the need for a special environment.

Another object is to provide a method of making a wagering card having a concealed wager which is easily, simply, rapidly, and irreversibly revealed without the need for a special environment.

A further object is to provide a method of making a promotional piece having a pair of advertisements, the first advertisement being initially visible and the second advertisement being initially concealed but easily, simply and rapidly revealed without the need for a special environment.

SUMMARY OF THE INVENTION

It has now been found that the above and related promotional or novelty product having a concealed message. The product comprises a sheet having an outer surface, ink visibly disposed on the outer surface in a first pattern, and transparent film overlying at least a portion of the inked outer surface and secured to the ink on the outer surface portion in selected differentially adherent patterns, the first pattern being visible through the film. Removal of the film from the inked outer surface portion also removes the ink in one of the selected patterns to reveal a desired pattern of deinked outer surface and thereby render visible the previously concealed message.

In a preferred embodiment for wagering purposes, the sheet outer surface comprises a layer, the ink comprises a layer, and the film comprises a layer, the product additionally including a release coating layer defining a pattern of release coating, disposed intermediate a pair of the layers, and causing the differential adhesion of the selected differentially adherent patterns.

Preferably the first pattern comprises a message different from the concealed message. Where the product is a wagering card representing a given wager variable, the first pattern is not related to the variable, and the second pattern is related to the variable. Where the product is a promotional piece, the first pattern is a first advertisement, and the second pattern is a second advertisement different from the first advertisement.

The present invention is especially directed to a process for manufacturing a flexible sheet product having a concealed message suitable for wagering, promotional and novelty applications, comprising the steps of providing a flexible sheet having a pair of substantially planar opposed outer surfaces and ink visibly disposed on one of the outer surfaces in a first pattern. The other of the outer surfaces is then temporarily supported on a rigid substrate while a. transparent film is laminated onto at least a portion of the inked outer surface. Thus the film is secured to the ink on the outer surface portion in selected differentially adherent patterns to form the product, the first pattern being visible through the film. Finally, the substrate is removed. In the product, removal of the film from the inked outer surface portion also removes the ink in one of the selected patterns to reveal a desired second pattern of deinked outer surface and thereby render visible the previously concealed message.

In a preferred embodiment, the inked sheet is supported and laminated to the film by passing the inked sheet and the film through the nip of a pair of substantially non-conforming rollers. At least one of the pair of rollers is heated, and the film is pre-heated by contact with such heated roller immediately prior to lamination to the inked sheet. The heated roller may also be embossed so as to impart a texture to the film of the laminate.

Preferably the process additionally includes the step of applying a transparent heat-sealable coating layer uniformly intermediate the ink and the film prior to lamination, optimally in sufficient thickness to permit substantial flexing of the product without delamination.

In another preferred embodiment, the sheet outer surface comprises a layer, the ink comprises a layer, and the film comprises a layer, and the process additionally includes the step prior to lamination of applying a release coating layer defining a pattern of release coating intermediate a pair of the other layers to cause the differential adhesion of the selected differentially adherent patterns. The release coating layer is applied intermediate the outer surface and ink layers, and the process additionally includes the steps of applying a transparent heat-sealable coating layer uniformly intermediate the ink layer and the film layer prior to lamination and bonding the heat-sealable coating layer to an underlying portion of the ink layer and an overlying portion of the film layer, preferably at least in part during lamination. The laminating of the transparent film onto at least a portion of the inked outer surface preferably is effected with heat and pressure and does not appreciably laminate the transparent film onto the other of the outer surfaces.

In yet another embodiment, ink is visibly disposed on each of the outer surfaces in a first pattern, and the process includes the additional step after lamination of temporarily supporting the one inked outer surface on a rigid substrate while laminating a second transparent film onto at least a portion of the other of the inked outer surfaces. The second film is secured to the ink on the other outer surface portion in selected differentially adherent patterns to form the product, the first patterns being visible through the first and second films, thereby to define a product wherein a first transparent film overlies at least a portion of the one inked outer surface without appreciably overlying the other of the inked outer surfaces, and a second transparent film overlies at least a portion of the other of the inked outer surfaces without appreciably overlying the one inked outer surface.

Typically the first pattern comprises a message different from the concealed message. Where the product is a wagering card representing a given wager variable, the first pattern is not related to the variable, and the second pattern differs from the first pattern and is related to the variable. Where the product is a promotional piece, the first pattern is a first advertisement, and the second pattern is a second advertisement different from the first advertisement.

BRIEF DESCRIPTION OF THE DRAWING

The above brief description, as well as further objects and features of the present invention, will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
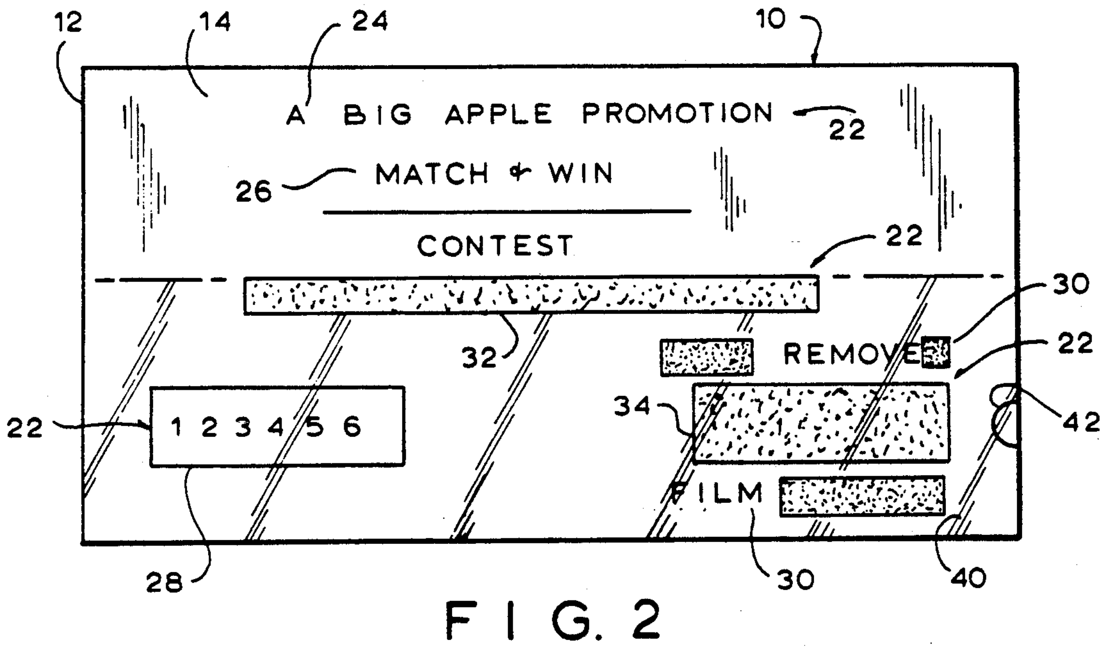
FIG. 1 is a top plan view of a product according to the present invention having a concealed message.
Figure 2:
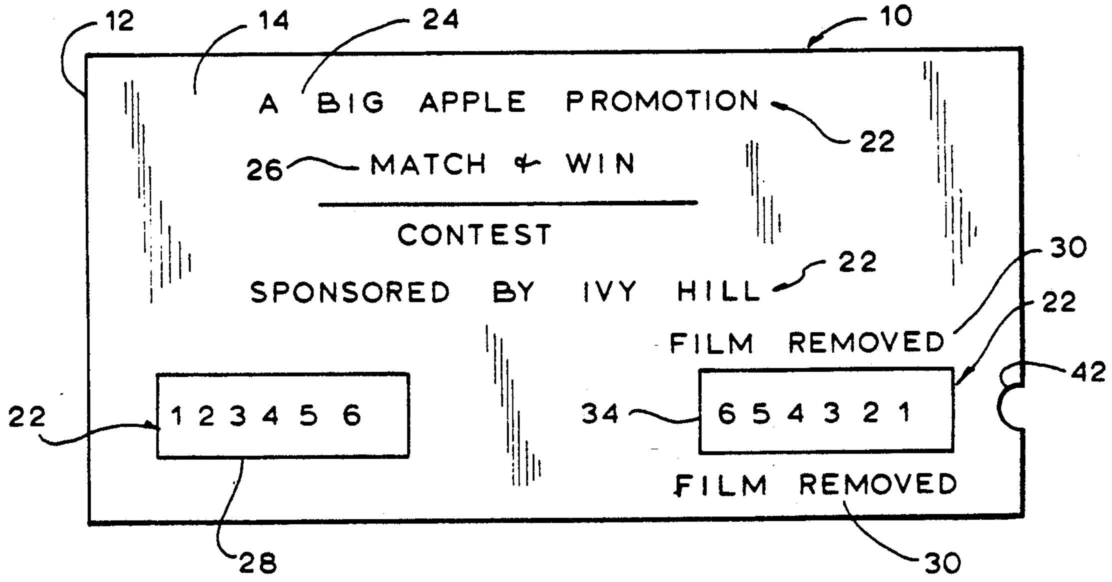
FIG. 2 is a top plan view of the product after removal of the transparent film therefrom to expose the heretofore concealed message on the sheet.

Referring now to the drawing, and in particular to FIG. 1 thereof, therein illustrated is a product having a concealed message according to the present invention, generally designated by the reference numeral 10. The illustrated product combines wagering, promotional and novelty aspects. Thus, it is a promotional device for the "BIG APPLE" generally and more specifically for Ivy Hill. as will become apparent hereinafter when the phrase "SPONSORED BY IVY HILL" appears on the face of the product. The product is a "match and win" type wagering product in which a given sequence of numbers is originally visible on the card on one side of the face (here, the left) and must be matched by a similar sequence of numbers on the other side of the card (here, the right side) in order to constitute a winning card. The sequence of numbers or digits to be matched is "123456" and, regretfully, as will become apparent hereinafter, this is a losing card as the concealed message is the sequence of digits "654321" —a non-match. The product is also clearly a novelty product, and it has a concealed message ("SPONSORED BY IVY HILL") which is only made visible by the action of the user.

More particularly, the product 10 comprises a sheet 12 having an outer surface 14. The sheet 12 is preferably a thin, flat piece of paper, paper board (e.g., cardboard), or other materials. The configuration and dimensions of the sheet 12 are a matter of design choice While the outer surface 14 herein illustrated is the top or front face of the sheet 12, the bottom or back face may be used in the same manner alternatively or in addition to the top or front face 14.

Ink 20 is visibly disposed on the outer surface 14 in a first pattern generally designated 22. The first pattern 22 includes various identificational, instructional, promotional or wagering information or data such as the name of the promotion 24 ("A BIG APPLE PROMOTION"), the type of wager 26 ("MATCH & WIN"), the winning sequence of digits 28 ("123456"), instructional matter 30 regarding use of the product ("REMOVE FILM") as well as obviously concealed message areas 32, 34. Clearly the identificational, promotional, instructional and wagering information and data may be varied without departing from the scope of the present invention. For example, letters, designs and the like may be used as the wager data 28, and the visible wagering data 28 may be positioned in vertical alignment with the concealed wagering data 34 so as to facilitate subsequent comparison.

A transparent film 40 overlies at least a portion of the outer surface 14, FIG. 1 illustrating the film 40 being disposed on the bottom half of the outer surface 14, although optionally it could be disposed in any desired configuration covering the concealed messages 32, 34. Where the first pattern 22 is covered by the transparent film 40, the first pattern 22 is visible through the film 40, as indicated with regard to areas 28-34. While the concealed message areas 32, 34 are illustrated as being a solid color, clearly they can be of an ornate or detailed design matching a similar ornate or detailed design occupying the remainder of the unused space of the product outer surface 14 or that portion thereof bearing transparent film 40. If desired, the ink pattern 22 initially visible in areas 32, 34 may contain additional wagering, promotional, instructional or other information.

A critical element of the present invention is that the transparent film 40 is secured to the ink 20 on the outer surface 14 in selected differentially adhered patterns. U.S. Pat. No. 4,972,953 describes a multitude of techniques for securing a transparent film to an ink on an outer surface in selected differentially adherent patterns, and any of the techniques described therein may be used for the purposes of the present invention. The substance of this application is hereby incorporated by reference as fully as if expressly set forth herein. Thus, in a first embodiment, the transparent film is secured to the ink in differentially adherent patterns through the use of an intermediate pattern of transparent heat-sealable coating followed by a uniform application of heat and pressure. (The pattern of heat-sealable coating may be applied either directly to the inked outer surface prior to application of the transparent film or directly to the transparent film prior to overlaying of the film on the inked outer surface.) In a second embodiment, the differentially adherent patterns between the transparent film and the inked outer surface are achieved by use of a uniform heat-sealable coating therebetween and the selected application of a pattern of heat and pressure to produce the desired pattern. In a third embodiment, the differentially adherent patterns between the transparent film and the inked outer surface are achieved exclusively through the selective application of heat and pressure without the use of a heat-sealable coating applied in either a pattern or uniform layer intermediate the transparent film and the inked outer surface. (These first three embodiments are also described in U.S. Pat. No. 4,718,553.) In the fourth embodiment, a uniform heat-sealable coating is applied and a uniform heat and pressure are applied, with the differentially adherent patterns being formed by a pattern of transparent release coating interposed between the ink layer and the heat-sealable coating layer in a first variation, between the heat-sealable coating layer and the transparent film in a second variation, and between the outer surface and the ink layer in a third variation.

While each of the techniques disclosed in these embodiments is useful in the practice of the present invention, when the product of the present invention is to be utilized for wagering purposes the fourth embodiment is preferred as providing superior concealment of the concealed message. Thus, in the preferred embodiment of the present invention, the sheet outer surface 14 comprises a first layer, the ink 20 comprises a second layer, and the transparent film 40 comprises a third layer, the product additionally including a release coating layer defining a pattern of transparent release coating 50 disposed intermediate a pair of the layers 14, 20, and 40 and causing the differential adhesion of the selected differentially adhered patterns. On the other hand, where the product is to be utilized for promotional or novelty purposes, where concealment of the concealed message is not as critical as in the wagering situation, the first embodiment is preferred as it is simpler and more economical.

Figure 3:
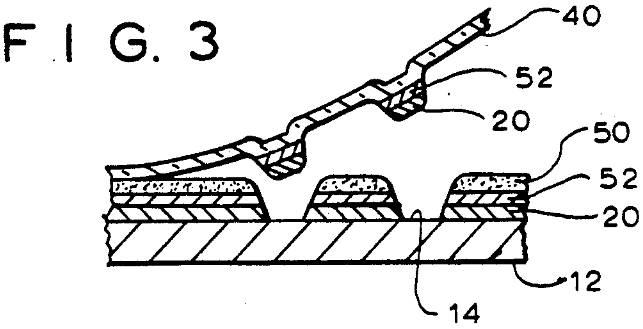
FIG. 3 is a sectional view of a preferred product of the present invention, to an enlarged scale, with the transparent film shown in the process of removal from the sheet.

Referring now to FIG. 3, therein illustrated is a product according to a preferred variant of the fourth embodiment wherein the transparent release coating 50 is disposed in a pattern intermediate a uniform layer of transparent heat-sealable coating 52 disposed on the inked outer surface of the sheet 12 and a transparent film 40. As the transparent film 40 is removed from the sheet 12, the ink 20 underlying the release coating 50 remains on the sheet outer surface 14 where it is prevented from bonding to the transparent film 40 by the release coating 50, while the ink 20 not underlying the release coating 50, and therefore bonded to the transparent film 40 by the heat-sealable coating 52 after a uniform application of heat and pressure, is removed with the transparent film 40.

Preferably, the sheet 12 is provided with an edge cut-out 42 (which may optionally be disposed on a corner) to facilitate an initial grasping of the transparent film 40 by the user in order to separate the film 40 from the sheet 12. Alternatively, the transparent film 40 may extend beyond an outer edge of the sheet 12 in order to provide a tab (not shown) to facilitate separation of the film from the sheet.

Upon removal of the transparent film 40 from the sheet 12, the appearance of the outer surface 14 is unchanged in the areas not covered by the film 40 (e.g., areas 24, 26) and those areas where no change is intended—that is, where the ink 20 is more adherent to the sheet 12 than to the film 40 (e.g., areas 28). On the other hand, in those areas where a change is intended—that is, where the ink 20 is more adherent to the film 40 than to the sheet 12, removal of the transparent film 40 from the sheet 12 results in the appearance of the concealed message ("SPONSORED BY IVY HILL") in area 32, the concealed wager data ("654321") in area 34, and the conversion of the instructional information ("REMOVE FILM") in area 30 to an indication of the removal of the film ("FILM REMOVED FILM REMOVED") and thus that the concealed wager data is no longer "virgin".

While the transparent film 40 may be overwrapped about the sheet 12, if desired, for reasons of economy, ease of removal and the like, the transparent film preferably overlies only one face of the sheet—that is, the top or front face 14. Thus, the transparent film may be laminated to the sheet —for example, using a Talboy Coater Laminator operating at 250° F., 60 feet per minute, and 60 pounds per sq. inch, to laminate NRAM-V/33 film (available from FIAP U.S.A. of Wilmington, Del.) to 0.018 S.B.S. (solid bleached sulfate) paperboard (available from International Paper), lithographically printed with ultraviolet printing ink on a conventional sheet-fed offset lithographic Methle Printing Press and bearing a screen-printed pattern of a heat-sealable coating 9094-008) (available from Valspar Corporation of Pittsburgh, Pa. 15233) having added solvents and a defoaming agent.

In a preferred embodiment, the transparent film is laminated to the sheet using a D&K Laminator (available from D&K Custom Machine Design, 80 Bond Street, Elk Grove Village, Ill. 60007) or like machinery operating on the "dry film concept". According to this concept, a dried adhesive has been pre-applied to the film, this adhesive becoming activated in the lamination process and, by the use of heat and pressure, bonding to a substrate. Thus this "dry film concept" is well suited for the process of the present invention. The laminator may be operated at about 300° F., about 20 feet per minute, and 90 pounds per sq. inch, to laminate OMI-984 BEBA, non-plasticized, PVC twistwrap film (film conventionally used as a twistwrap for candy, available from OMAL International, P.O. Box 942, Denville, N.J.) to 0.010 S.B.S. (solid bleached sulfate) paperboard (available from Westvaco, 299 Park Avenue, New York, N.Y. 10171) lithographically printed with ultraviolet printing ink on a conventional sheet-fed offset lithographic printing press and bearing a gravure-printed pattern of heat sealable coating 9094-008 (available from Valspar Corporation of Pittsburgh, Pa. 15233) having added solvents.

It will be appreciated that the user has only to separate the transparent film 40 from the sheet 12 in order to reveal the concealed messages 32, 34 easily, simply and rapidly, without the need for a special environment involving fluids, darkness, exposure to light, heat or the like.

Figure 4:
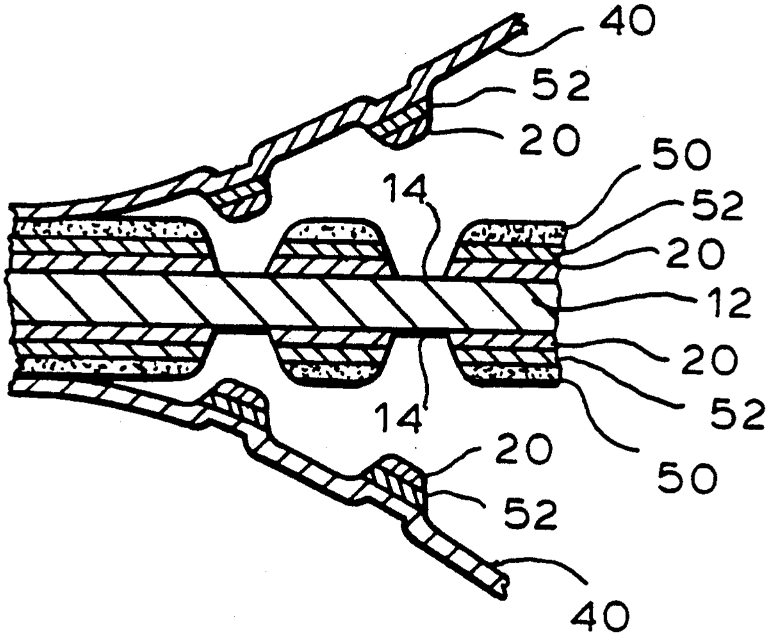
FIG. 4 is a sectional view of a product of the present invention having a concealed message on each side thereof, to an enlarged scale, with both transparent films being shown in the process of removal from the sheet.

Referring now to FIG. 4, therein illustrated is a preferred product according to the present invention wherein the bottom or back face is used in the same manner as the top or front face 14. The transparent film 40 on each side of the sheet 12 is illustrated in the process of being removed therefrom in order to reveal the concealed message areas on both sides. In such an embodiment, where there is a concealed message on both sides of the sheet 12, each face of the sheet may contain an appropriate notice (such as "Try the other side of the sheet for a second chance!") to indicate to the user that both transparent films should be removed from the sheet.

While the same materials may be used to produce both tamper-resistant packaging (the TRP feature described in U.S. Pat. No. 4,718,553 and U.S. Pat. No. 4,972,953, hereby incorporated by reference) and the present product having a concealed message (the LOTTO feature), the methods used to produce the finished product in each case are preferably different.

The TRP feature is primarily intended to be used on folding cartons. Normally, to form a laminated carton wall, a film is applied (laminated) to the printed walls of the folding carton while the carton is in flat form, before the carton "blanks" are cut and creased from the blank sheet. In other words, the film is laminated to the printed sheet, and then the sheet is cut and creased. The film of the conventional carton laminate is not intended to be removed from the printed carton surface; to the contrary, the film is intended to be very permanently secured to the carton. However, such conventional lamination prior to carton erection would not suffice for producing a TRP seal as it would not provide the desired hermetic-like seal which ensures carton integrity (i.e., non-tampering).

The TRP carton is characteristically a fragile, three dimensional object, liable to be crushed under even minor pressure. Further, it may contain a product which is likely to be adversely affected by the intense heat and pressure normally required to activate the typical coatings employed in such a carton.

Thus, a TRP folding carton is typically produced by first printing a sheet of solid bleached sulfate (SBS) paperboard. The sheet is then selectively coated with heat-seal and/or release coatings. Next, the printed and coated sheet is die cut and creased. Typically, several carton "blanks" are die cut and creased from a single sheet of SBS. Each blank is then folded on a gluing machine, and a glue seam is formed to finish the carton. The finished carton is packed flat in a shipping case and delivered to the customer.

The customer will erect the cartons and insert product. The product usually fills most of the interior of the erected carton, but the product rarely provides support to the carton walls. For example, tea bags inside a folding carton provide essentially no support to the carton. The carton itself provides only minimal support and protection to the tea bags. The carton primarily serves as a means of organizing the tea bags and enables stacking them on retail outlet shelving. The carton and tea bags could easily be crushed by squeezing the filled carton between your hands. If further protection were needed to protect the tea bags, the customer might consider packing them in a set-up style of box, a wooden box, or a metal tin.

The patterned coating (which eventually results in the tamper evidencing typography) is customarily positioned on the TRP cartons to take advantage of the strongest structural area of the carton—namely, the corners of the carton walls which support the panels that are receiving heat and pressure. The support provided by these walls diminishes as you reach the center of the panels to which heat and pressure are applied. Applying too much pressure is liable to destroy (i.e., crush) the carton or its contents.

One problem encountered is concaving of the carton walls under pressure during the application of heat and pressure to cause the adhesion of the film to the carton. This concaving is only sporadic but, when it does occur, causes poor or no contact between the film and the underlying coating so that the film can be removed for tampering essentially without disturbing the underlying layers and thus without producing evidence of tampering. Another problem encountered is convexing of the carton walls during the application of heat and pressure. Convexing is theoretically desirable because, as the heated air inside the carton expands, it forces the walls of the carton outwardly against the rollers, thereby adding support to the carton wall. The problem is that this convexing action seems to be unpredictable and cannot be relied upon without leading to non-uniformity in the finished cartons. Accordingly, it is necessary to employ flexible rollers capable of conforming to irregularities in the carton walls due to flexing (whether concave or convex).

If one were to take a printed and coated sheet, lay film over this sheet, and hold it up in the air while exposing the assembly to heat, appropriate lamination would not take place, not even if one secured the film to the sheet with tape to prevent the film from shrinking totally away from the surface of the printed and coated sheet during the application of heat. In testing the TRP feature on tea cartons, the process of adhering the film to the coated areas of the tea carton was found to be very difficult because the walls of the carton became concave when heat and pressure were applied. Extreme care had to be taken to avoid crushing the carton. The result was a painfully slow process of accomplishing a seal, and in some cases the result was a complete failure.

Figure 5:
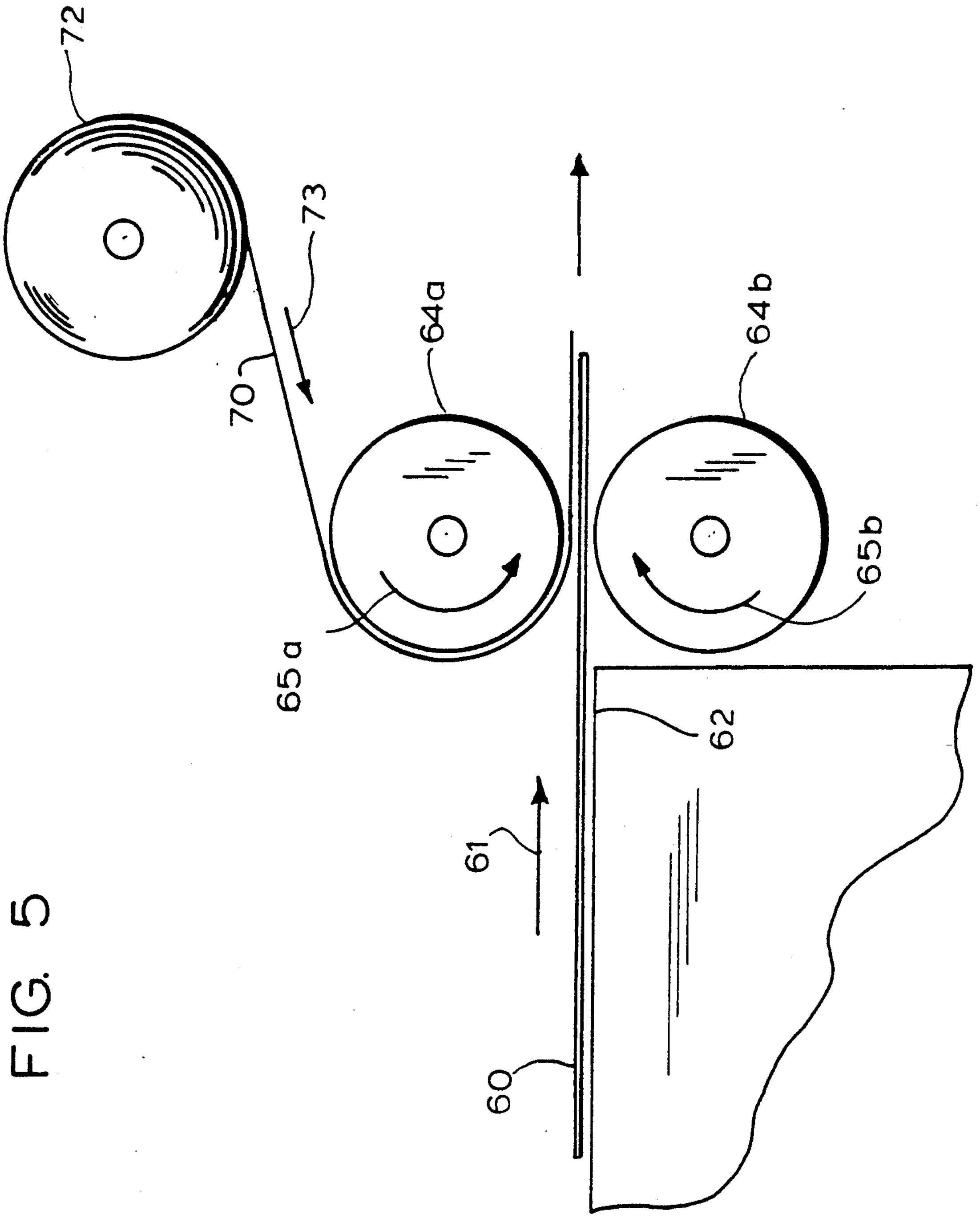
FIG. 5 is a schematic of a preferred method of applying film to the sheet.

Referring now to FIG. 5, by way of contrast, the LOTTO feature is intended to be used on flexible, thin, planar sheets rather than cartons. These sheets remain two dimensional and can sustain tremendous amounts of pressure. The two dimensional sheets do not contain a product, so there is no danger of damage thereto from extreme heat or pressure (as would be the case if erected and filled TRP packages were sent through laminating equipment). Thus a paperboard SBS sheet is printed and selectively coated with heat-seal and/or release coatings. Instead of cutting and creasing, as in TRP carton manufacture, the planar printed and coated LOTTO sheet 60 is then sent through laminating equipment. Instead of applying the overwrap film to a TRP carton in one step and then exposing the overwrapped carton to heat and pressure in a separate second step, the LOTTO sheet 60 travels in the direction of arrow 61 on belts (not shown), over a firm surface 62, eventually passing through the nip of a pair of hard metal or like substantially non-conforming rollers 64*a*, 64*b* rotating in the direction of arrows 65*a*, 65*b*, where the film 70 from a film supply roll 72 is introduced to the sheet 60 immediately before lamination takes place. Preferably, as illustrated, the film 70 travels in the direction of arrow 73 partially about a heated one 64*a* of the rollers before contacting the sheet 60, thereby to pre-heat the film 70 immediately prior to its contacting the sheet 60. Lamination is accomplished by pinching the film 70 and sheet 60 together under intense heat and pressure. The rollers 64*a*, 64*b* pinching the assembly of film 70 and sheet 60 together support these two flexible materials during the lamination (film-securing) step. The hard rollers of the lamination equipment provide a firm surface to support the sheet and prevent it from flexing, thereby enabling the desired firm seal between the laminate layers.

In some cases, etched hard metal rollers may be used to provide additional masking of the hidden message. The embossing caused by the etched rollers can also serve to remove imperfections on the surface of the film, creating a more desirable finish.

In conclusion, the lamination process used to provide the LOTTO feature is infinitely more suited to accomplish a selective adhesion seal than is the overlaying process used to provide the TRP feature. The ability to apply heat and pressure to a rigidified planar surface (as well as the ability to impart a texture to the surface of the film by using an embossing roller) serve to help hide the latent image of the patterned coating.

If a selective adhesion seal is desired on both sides of the LOTTO sheet, each side of the sheet may be laminated separately using existing technology. In other words, both sides of the sheet would be printed, then one side would be coated and laminated, and finally the other side would be coated and laminated. Alternatively, if the technology is or becomes available, after printing, both side of the sheet may be coated and laminated simultaneously.

Another fundamental difference between TRP and LOTTO is the amount of coating desirably deposited on the sheets in each case. In the case of TRP, minimal amounts of patterned coating are preferably applied. The TRP feature is frequently intended to be used on pharmaceutical cartons, and the information on the carton (i.e., instructions for use) is very important and should be left behind after the TRP feature is activated (i.e., the carton opened). Thus the message or patterned coating is typically applied in solid color areas so that, when the TRP feature is activated, the result is a message "dropped-out" or "knocked-out" of the solid color background—that is, a white message on a solid color background. Also, by depositing minimal amounts of heat seal coating and ending up with minimal adhesion, the wrapper can be removed in an acceptably easy manner. If adhesion were greater, one might find it difficult or impossible to get to the contents of the package without destroying the carton and any instructions thereon.

By way of contrast, in the case of LOTTO, major amounts of coating—especially the heat-sealable coating—are preferably applied because of the flexible nature of the finished product. For instance, if the product were a magazine advertising insert, the flexing of the magazine, whether in transit or during reading, might disrupt the ad by activating it—i.e., causing film/sheet separation or delamination. Heavy coverage serves to prevent delamination during even substantial flexing. Despite the heavy coverage, the film is easily activated (i.e., removed from the sheet) by use of an uncoated, and hence easily grasped, tab area on the corner of the film or a film tab projecting peripherally from the sheet. When the LOTTO feature is activated, the result is typically (although not necessarily) a primarily positive or pigmented image remaining on a white or lighter background.

To summarize, the present invention provides a method of making a product having a concealed message which is easily, simply and rapidly revealed without the need for a special environment. As a wagering card, the product irreversibly reveals the concealed wager once it is revealed, and as a promotional piece may include a pair of advertisements, one being initially visible and the second one being initially concealed but easily, simply and rapidly revealed without the need for a special environment.

Now that the preferred embodiments of the present invention have been shown and described in detail, various modifications and improvements thereon will become readily apparent to those skilled in the art. Accordingly, the appended claims are to be construed broadly and in a manner consistent with the spirit and scope of the invention described herein.

I claim:

1. A process for manufacturing a flexible sheet product having a concealed message suitable for wagering, promotional and novelty applications, comprising the steps of:

(A) providing a flexible non-metallic sheet having a pair of substantially planar opposed outer surfaces and ink visibly disposed on one of the outer surfaces in a first pattern;

(B) temporarily supporting the other of the outer surfaces on a rigid substrate while laminating a non-metallic transparent film onto at least a portion of the inked outer surface, the first pattern being visible through the film, the film being secured to the ink on the outer surface portion in selected differently adherent patterns to form a product in which removal of the film from the inked outer surface portion also removes the ink in one of the selected patterns to reveal a desired second pattern of deinked outer surface and thereby render visible the previously concealed message; and (C) removing the substrate.

2. The process of claim 1 additionally including the step of applying a transparent heat-sealable coating layer uniformly intermediate the ink and the film prior to lamination.

3. The process of claim 1 wherein the sheet outer surface comprises a layer, the ink comprises a layer, and the film comprises a layer, and additionally including the step prior to lamination of applying a release coating layer defining a pattern of release coating intermediate a pair of the other layers to cause the differential adhesion of the selected differentially adherent patterns.

4. The process of claim 3 wherein the release coating layer is applied intermediate the outer surface and ink layers, and additionally including the steps of applying a transparent heat-sealable coating layer uniformly intermediate the ink layer and the film layer prior to lamination and bonding the heat-sealable coating layer to an underlying portion of the ink layer and an overlying portion of the film layer.

5. The process of claim 4 wherein the bonding of the heat-sealable coating layer is effected at least in part during lamination.

6. The process of claim 3 additionally including the step of applying a transparent heat-sealable coating layer uniformly intermediate the ink layer and the adjacent overlying one of the film layer and the release coating layer prior to lamination.

7. The process of claim 1 wherein the laminating of the transparent film onto at least a portion of the inked outer surface does not appreciably laminate the transparent film onto the other of the outer surfaces.

8. The process of claim 1 wherein ink is visibly disposed on each of the outer surfaces in a first pattern, and including the additional step after lamination of temporarily supporting the one inked outer surface on a rigid substrate while laminating a second transparent film onto at least a portion of the other of the inked outer surfaces, the second film being secured to the ink on the other outer surface portion in selected differentially adherent patterns to form the product, the first patterns being visible through the first and second films, thereby to define a product wherein a first transparent film overlies at least a portion of the one inked outer surface without appreciably overlying the other of the inked outer surfaces, and a second transparent film overlies at least a portion of the other of the inked outer surfaces without appreciably overlying the one inked outer surface.

9. The process of claim 1 wherein lamination is effected with heat and pressure.

10. The process of claim 1 wherein the first pattern comprises a message different from the concealed message.

11. The process of claim 1 wherein the product is a wagering card representing a given wager variable, the first pattern is not related to the variable, and the second pattern differs from the first pattern and is related to the variable.

12. The process of claim 1 wherein the product is a promotional piece, the first pattern is a first advertisement, and the second pattern is a second advertisement different from the first advertisement.

13. The process of claim 1 wherein the inked sheet is supported and laminated to the film by passing the inked sheet and the film through the nip of a pair of substantially non-conforming rollers.

14. The process of claim 13 wherein at least one of the pair of rollers is heated, and the film is pre-heated by contact with such heated roller immediately prior to lamination to the inked sheet.

15. The process of claim 14 wherein the heated roller is embossed so as to impart a texture to the film of the laminate.

16. The process of claim 2 wherein the heat-sealable coating layer is of sufficient thickness to permit substantial flexing of the product without delamination.

17. A process for manufacturing a flexible sheet product having a concealed message suitable for wagering, promotional and novelty applications, comprising the steps of:

(A) providing a flexible non-metallic sheet having a pair of substantially planar opposed outlet surfaces and ink visibly disposed on one of said outer surfaces in a first pattern and providing a transparent non-metallic film;

(B) passing the inked sheet and the film through the nip of a pair of substantially non-conforming rollers to temporarily support the other of the outer surfaces on a rigid substrate while laminating with heat and pressure the film onto at least a portion of the inked outer surface without appreciably laminating the film onto the other of the outer surfaces, the film being secured to the ink on the outer surface portion in selected differently adherent patterns to form the product, the first pattern being visible through the film, at least one of the pair of rollers being heated, the film being pre-heated by contact with such heated roller immediately prior to lamination to the inked sheet, the heated roller also being embossed so as to impart a texture to the film of the laminate; and (C) removing the substrate;

whereby in the product removal of the film from the inked outer surface portion also removes the ink in one of the selected patterns to reveal a desired second pattern of deinked outer surface and thereby render visible the previously concealed message, the first pattern comprising a message different from the concealed message.

* * * * *